(12) United States Patent
Frederick et al.

(10) Patent No.: US 8,818,589 B2
(45) Date of Patent: Aug. 26, 2014

(54) SYSTEM AND METHOD FOR CONTROLLING A VEHICLE

(75) Inventors: Kenneth Frederick, Dearborn, MI (US); Matthew D. Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 596 days.

(21) Appl. No.: 13/016,075

(22) Filed: Jan. 28, 2011

(65) Prior Publication Data

US 2012/0197468 A1 Aug. 2, 2012

(51) Int. Cl.
| | |
|---|---|
| *B60L 9/00* | (2006.01) |
| *B60W 10/26* | (2006.01) |
| *B60W 10/06* | (2006.01) |
| *B60W 10/08* | (2006.01) |
| *B60W 30/192* | (2012.01) |
| *B60W 20/00* | (2006.01) |

(52) U.S. Cl.
CPC ............ *B60W 20/00* (2013.01); *Y02T 10/6286* (2013.01); *B60W 10/26* (2013.01); *B60W 10/06* (2013.01); *B60W 20/104* (2013.01); *B60W 10/08* (2013.01); *B60W 2550/143* (2013.01); *B60W 30/192* (2013.01); *Y10S 903/903* (2013.01)
USPC .............................. 701/22; 701/102; 903/903

(58) Field of Classification Search
CPC ..... B60W 20/00; B60W 10/08; B60W 10/06; B60W 2050/0089; F02D 41/18; F02D 2200/0402

USPC ..................................... 701/22, 102; 903/903
See application file for complete search history.

(56) References Cited

U.S. PATENT DOCUMENTS

| | | | |
|---|---|---|---|
| 6,314,347 B1 * | 11/2001 | Kuroda et al. ................... | 701/22 |
| 6,371,889 B1 * | 4/2002 | Kuroda et al. ................ | 477/181 |
| 2007/0136040 A1 | 6/2007 | Tate, Jr. | |
| 2007/0136640 A1 * | 6/2007 | Jarrar ............................ | 714/763 |
| 2008/0027639 A1 * | 1/2008 | Tryon ............................ | 701/209 |
| 2008/0275644 A1 * | 11/2008 | Macneille et al. ............. | 701/209 |
| 2010/0106351 A1 * | 4/2010 | Hanssen et al. ................. | 701/22 |
| 2010/0174484 A1 * | 7/2010 | Sivasubramaniam et al. ............................. | 701/213 |
| 2010/0242481 A1 * | 9/2010 | Shamoto et al. ............... | 60/698 |

FOREIGN PATENT DOCUMENTS

| | | |
|---|---|---|
| EP | 1256476 A2 | 11/2002 |
| EP | 2083156 A1 | 7/2009 |

* cited by examiner

*Primary Examiner* — Helal A Algahaim
*Assistant Examiner* — Shardul Patel
(74) *Attorney, Agent, or Firm* — David B. Kelley; Brooks Kushman P.C.

(57) ABSTRACT

Location information may be used to adjust the engine start/stop characteristics of a hybrid electric vehicle (HEV) in order to increase the amount of electric vehicle (EV) mode driving, particularly near a destination in which an ignition-off event may occur. Common ignition-off locations may be learned and stored in a database along with the number of ignition-off occurrences associated with each learned location. The vehicle may calculate current distance to a nearest ignition-off location stored in the database using positioning system coordinates and may determine whether to adjust one or more engine pull-ups based at least in part on the distance and the corresponding number of ignition-off occurrences.

14 Claims, 3 Drawing Sheets

SYSTEM AND METHOD FOR CONTROLLING A VEHICLE

TECHNICAL FIELD

The present application relates to a vehicle system and method for optimizing electric vehicle (EV) mode driving near a destination.

SUMMARY

A method, according to one or more embodiments of the present application, may include determining a current location of a vehicle and calculating a distance from the current location to a nearest waypoint stored in a database. The method may further include adjusting an engine pull-up characteristic based at least in part upon the distance and a score associated with the nearest waypoint.

The step of determining a current location of a vehicle may include receiving coordinate information for the vehicle from a positioning system associated with the vehicle. Moreover, the database may include a plurality of waypoints, each associated with a location of the vehicle where at least one prior ignition-off event occurred. The score may be stored in the database along with coordinates for the nearest waypoint. The score may be based at least in part upon a number of prior ignition-off events associated with the nearest waypoint. Furthermore, the score may be based upon the recentness of at least one of the number of prior ignition-off events associated with the nearest waypoint.

The method may further include detecting an occurrence of a new ignition-off event and determining whether a new location associated with the new ignition-off event corresponds to a stored location associated with one of the waypoints stored in the database. Furthermore, the method may include storing the new location of the new ignition-off event as a new waypoint in the database upon a determination that the new location does not correspond to a stored location associated with one of the waypoints stored in the database. Alternatively, the method may further include, upon a determination that the new location of the new ignition-off event does correspond to a stored location associated with one of the waypoints stored in the database, increasing a count of ignition-off events associated with said one of the waypoints stored in the database.

The step of adjusting an engine pull-up characteristic based at least in part upon the distance and a score associated with the nearest waypoint may include increasing an amount of power, requested by a driver through an accelerator pedal, required to start an engine when the vehicle is operating in an electric vehicle (EV) mode. Increasing an amount of power required to start the engine may include increasing an electric vehicle (EV) threshold associated with the position of the accelerator pedal. Alternatively, the step of adjusting an engine pull-up characteristic based at least in part upon the distance and a score associated with the nearest waypoint may includes decreasing a minimum state of charge (SOC) threshold associated with a battery.

Another method, according to one or more embodiments of the present application, may include receiving coordinates from a positioning system corresponding to a current location of a vehicle. The current location information may be compared to coordinate information corresponding to a plurality of waypoints stored in a database to determine a nearest waypoint. Each of the waypoints in the database may be associated with a location of the vehicle where at least one prior ignition-off event occurred. Moreover, each of the waypoints in the database may be associated with a number of prior ignition-off events that occurred at the location. A distance from the current location of the vehicle to the nearest waypoint may be calculated. Further, an engine pull-up characteristic may be adjusted based at least in part upon the distance and the number of prior ignition-off events associated with the nearest waypoint.

Adjusting the engine pull-up characteristic may include increasing an electric vehicle (EV) threshold, corresponding to an amount of power requested by a driver through an accelerator pedal, required to start an engine when the vehicle is operating in an EV mode (e.g., with the engine off). Additionally or alternatively, adjusting the engine pull-up characteristic may include decreasing a state of charge (SOC) threshold associated with a battery.

A vehicle system, according to one or more embodiments of the present application, may include an engine, a positioning system that obtains location information associated a current location of a vehicle, and a database including a plurality of waypoints, each associated with a location of the vehicle where at least one prior ignition-off event occurred. The system may further include a controller in communication with the positioning system, the database, and the engine. The controller may be configured to calculate a distance from the current location to a nearest waypoint stored in the database and adjust an engine pull-up characteristic based at least in part upon the distance and a score associated with the nearest waypoint.

The score may be based at least in part upon a number of prior ignition-off events associated with the nearest waypoint. Further, the score may be based upon the recentness of at least one of the number of prior ignition-off events associated with the nearest waypoint.

The system may further include an accelerator pedal in communication with the controller. Moreover, adjusting an engine pull-up characteristic based at least in part upon the distance and the score associated with the nearest waypoint may include increasing an electric vehicle (EV) threshold, corresponding to an amount of power requested by a driver through the accelerator pedal, required to start the engine when the vehicle is operating in an EV mode.

Additionally or alternatively, the system may include a battery in communication with the controller. Moreover, adjusting an engine pull-up characteristic based at least in part upon the distance and the score associated with the nearest waypoint includes decreasing a state of charge (SOC) threshold associated with the battery.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
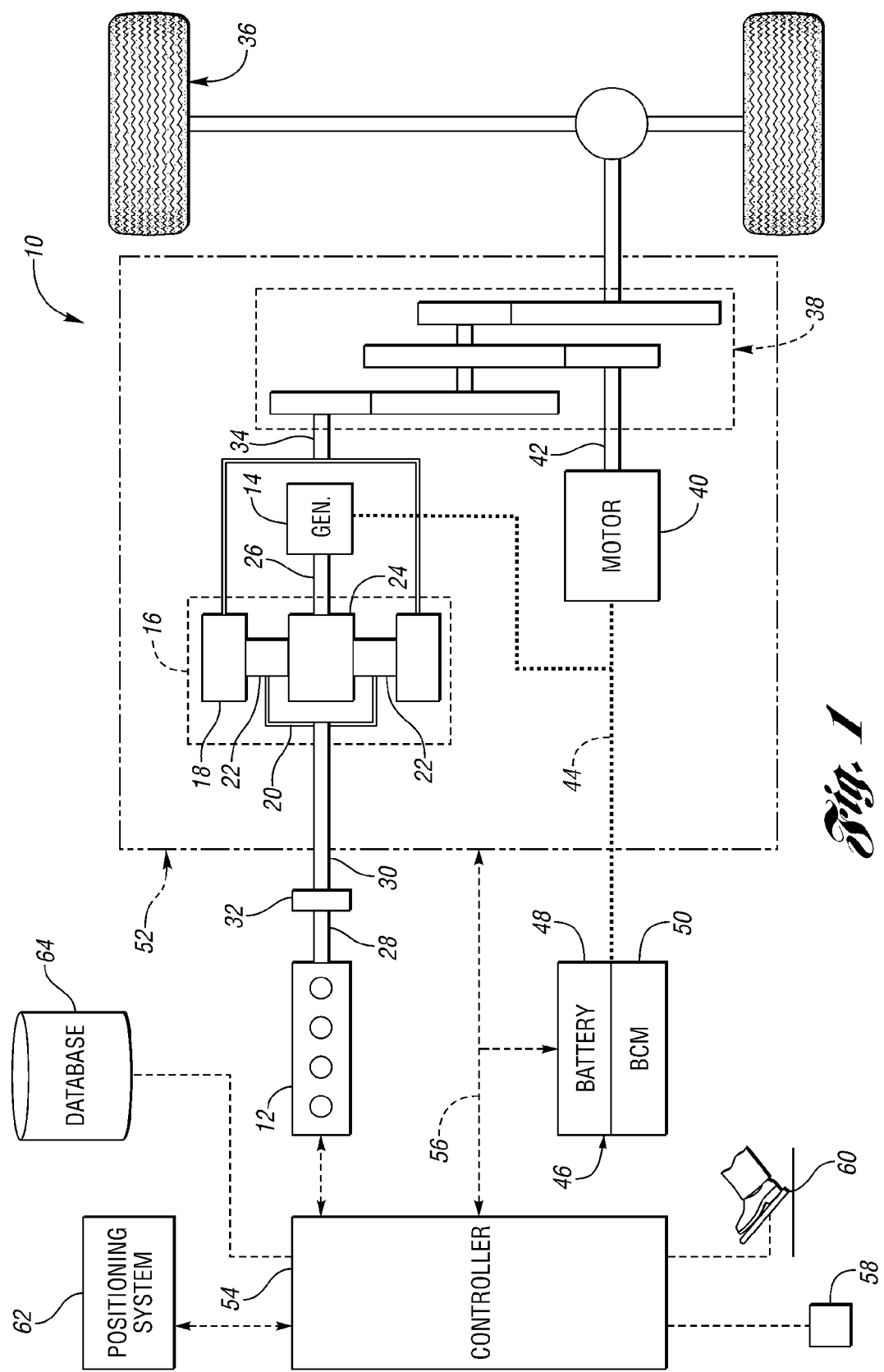
FIG. 1 is a simplified, exemplary schematic representation of a hybrid electric vehicle (HEV) according to one or more embodiments of the present application.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as vehicle controller 54, may be provided. Although it is shown as a single controller, it may include multiple controllers that may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up the control system in accordance with the present application.

Also shown in FIG. 1 are simplified schematic representations of a braking system 58 and an accelerator pedal 60. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, may communicate with the controller 54.

In addition to the foregoing, the vehicle 10 may include a positioning system 62 (e.g., a global positioning system or GPS), which may also communicate with the controller 54. The positioning system 62 may include a positioning sensor (not shown) that can provide coordinates (e.g., latitude and longitude information) for the vehicle 10 to the controller 54. As explained in detail below, current and past vehicle coordinates may be stored in a database 64 associated with the controller 54 or the positioning system 62. Further, the controller 54 may recall the stored coordinates from the database 64 for use in controlling the vehicle 10. The database 64 may be contained within memory of the controller 54 or within an external memory device (not shown) in communication with the controller 54.

An HEV, such as vehicle 10, may be operated with the engine off in an electric vehicle (EV) mode. Operating the vehicle 10 in the EV mode may reduce fuel consumption. Correspondingly, increased EV mode driving may result in improved fuel economy. Thus, a driver of vehicle 10 may want to maximize the amount driving in the EV mode. However, the battery 48 may be relatively small, and may only supply EV driving for certain distances before starting the engine 12 in order to recharge the battery 48 via the generator 14. A battery state of charge (SOC) threshold may be employed to start and stop the engine 12 based on the amount of charge remaining in the battery 48. For instance, when the battery SOC falls below a minimum SOC threshold, the engine 12 may start to begin the recharging process.

Moreover, the battery power may be insufficient to meet the power demands of the driver as requested through the acceleration pedal 60. The engine 12 may be started to supply additional motive force to the drive wheels 36 to assist the motor 40 in meeting the driver demand. To this end, an EV threshold associated with the accelerator pedal 60 may be used to start and stop the engine 12 based on driver demand. For example, when the position of the accelerator pedal exceeds a corresponding pedal threshold value (e.g., the EV threshold), the engine 12 may be started to supply the necessary additional torque required at the wheels 36 to meet the driver demand.

Accordingly, a driver may be able to start and stop the engine 12 and, to a certain extent, control when the vehicle 10 is in the EV mode. In order to balance the charge of the battery 48, a compromised calibration of the EV threshold may be made. At times, this compromise may cause the engine 12 to start upon the application of very light pressure to the accelerator pedal 60. These light pedal applies may cause the engine 12 to start because, in the EV mode, future vehicle operating conditions may be unknown. Moreover, the vehicle 10 may not know the time or distance to a final destination. Thus, the engine 12 may start due to relatively light pressure applied to the accelerator pedal 60, with relatively little time or distance remaining until the final destination is reached (e.g., ignition is shut off). For example, a relatively light pedal application may cause the engine 12 to start despite the vehicle 10 being in a parking lot or driveway of the final destination, or otherwise within a relatively short distance from the final destination. A driver may perceive starting the engine 12 in a parking lot as a poor or inefficient use of fuel.

Additionally, a driver who attempts to control the EV driving manually may not estimate the amount of battery SOC correctly. As the vehicle 10 approaches the final destination, the engine 12 may start because of a low SOC, which may also result in driver dissatisfaction. A calibration change to the EV threshold or the battery SOC threshold could provide for more EV driving upon light accelerator pedal inputs and in parking lot-type driving. However, normal city driving may have higher battery usage as a result, and lead to lower fuel economy.

The EV threshold and battery SOC threshold are two examples of an engine pull-up characteristic. An engine pull-up characteristic may determine when an engine turns on (or remains on if already started) based on current vehicle operating conditions. According to one or more embodiments of the present application, the EV threshold and/or the battery SOC threshold may be adjusted based upon the latitude and longitude information received from the positioning system 62. For instance, the positioning system 62 may be used to predict an ignition-off event and to measure the distance to the final destination associated with the ignition-off event. Once a future ignition-off event is known, the EV threshold may be changed as a function of the distance of the vehicle 10 to the final destination. As an example, the EV threshold may be increased as the vehicle 10 approaches a familiar destination, thereby increasing the likelihood that the vehicle 10 will enter or remain in the EV mode. A driver may perceive an increased benefit in fuel economy by not starting the engine 12 near the end of a trip.

Figure 2:
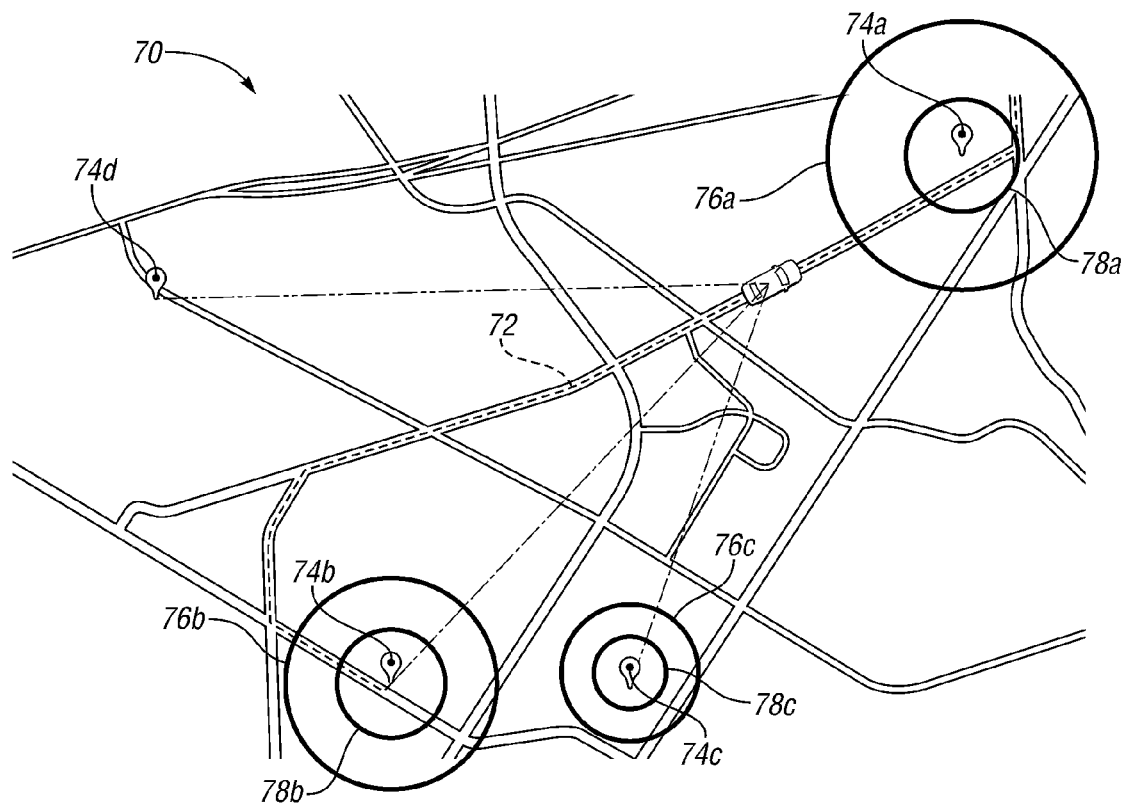
FIG. 2 is a simplified, exemplary map illustrating the use of latitude and longitude information to adjust one or more engine pull-ups according to one or more embodiments of the present application.

FIG. 2 depicts a simplified, exemplary road map 70 illustrating the use of the positioning system 62 to adjust the EV threshold and/or the battery SOC threshold according to one or more embodiments of the present application. As seen therein, the vehicle 10 may be traveling along a road 72. The positioning system 62 may communicate the vehicle's current coordinates (e.g., latitude and longitude information) to the controller 54. When the vehicle 10 reaches a destination, as indicated by an ignition-off event, coordinate information corresponding to the ignition-off location may be stored in the database 64 (i.e., "learned"). As previously described, the database 64 may store coordinates for several ignition-off locations. Each ignition-off location may be referred to as a waypoint 74. A waypoint may be a reference point in physical space used for the purposes of navigation. To this end, a waypoint may be associated with one or more sets of coordinates (or a range of coordinates) used to generally identify a previous ignition-off location for the vehicle 10. Accordingly, the controller 54 may detect familiar ignition-off locations as waypoints 74 in the vicinity of the vehicle 10.

According to one or more embodiments of the present application, the database 64 may store the number of ignition-off occurrences at each waypoint 74. Each stored waypoint 74 may have an associated waypoint score or confidence value. For instance, the more frequent an ignition-off event occurs at a waypoint 74, the higher the score may be for the associated waypoint. Additionally or alternatively, a waypoint 74 may be scored higher for more recent ignition-off occurrences. Moreover, the waypoints 74 may be ranked in the database 64 based upon their waypoint score. The database 64 may store only a certain number of the most frequent waypoints (e.g., due to memory or other system constraints). In this regard, over time, the vehicle 10 may "unlearn" waypoints that have a relatively low occurrence of ignition-off events (e.g., a relatively low waypoint score).

In one example, a waypoint's score may be incremented by one or more points for each ignition-off occurrence. Thus, the database 64 may contain the N most frequently occurring waypoints based on a pure count of ignition-off events. In another scoring example, in addition to the foregoing, one or more points may be deducted from a waypoint's score when an ignition-off event occurs at a different waypoint. Thus, the waypoint score may account, at least to an extent, the recentness of ignition-off events at an associated waypoint. As a more specific example, a waypoint's score may be increased by ten points when an ignition-off event occurs at the corresponding waypoint. Further, each of the other N-1 waypoints may receive a one point deduction in their corresponding waypoint scores. If the ignition-off event occurs at a location not currently stored in the database 64, then all N waypoints that are currently stored may receive the one-point deduction. Moreover, the waypoint with the lowest score may be "unlearned" so that the new waypoint may be added to the database 64. Accordingly, the waypoint scoring may reflect the most frequent and most recent ignition-off event locations.

As previously indicated, the waypoint score may provide the controller 54 with a level of confidence for predicting future ignition-off events. The likelihood of a future ignition-off event occurring at a particular waypoint 74 may be higher based on the number of previous ignition-off events at the waypoint and, perhaps, how recent previous ignition-off events occurred. To this end, alternative waypoint scoring systems may be employed, other than the examples described above, without departing from the scope of the present application.

The controller 54 may calculate the current distance to the nearest learned waypoints 74 based on the vehicle's current location (e.g., GPS coordinates) and the location information for each waypoint 74 stored in the database 64. Moreover, the controller 54 may adjust the EV threshold and/or the SOC threshold based upon the vehicle's distance to a learned waypoint and the waypoint's associated waypoint score. For instance, the EV threshold may be increased if the distance to a learned waypoint is relatively close and the number of ignition-off events is sufficient. Consequently, greater pressure applied to the accelerator pedal 60 may be required before the engine 12 starts and the vehicle 10 exits the EV driving mode. In turn, the likelihood that the engine 12 is started very near the vehicle's destination may be reduced. Similarly, the SOC threshold may be decreased if the distance to a learned waypoint is relatively close and the number of ignition-off events is sufficient. In this regard, the likelihood of starting the engine 12 in order to charge the battery 48 very near the vehicle's destination may also be reduced.

FIG. 2 depicts exemplary waypoints 74$a$-$d$ within the vicinity of the vehicle 10 that may be stored in the database 64. For instance, waypoint 74$a$ may correspond to a learned location associated with a relatively high number of ignition-off events. Waypoint 74$b$ may correspond to a learned location associated with an intermediate number of ignition-off events. Waypoint 74$c$ may correspond to a learned location associated with relatively few ignition-off events. Each waypoint 74 may be centrally located within an imaginary outer ring 76 and an imaginary inner ring 78. The outer ring 76 may represent an outer distance threshold to the waypoint 74 in which the controller 54 may begin adjusting the EV threshold and/or SOC threshold. Thus, the controller 54 may not increase the EV threshold or decrease the SOC threshold at least until the positioning system 62 indicates that the vehicle 10 is within an outer ring 76 of a waypoint 74. The inner ring 78 may represent an inner distance threshold in which the controller 54 may stop adjusting the EV threshold and/or SOC threshold. In this regard, the EV threshold may be at its maximum and the SOC threshold may be at its minimum for a given waypoint 74 when the vehicle 10 reaches its inner ring 78.

According to one or more embodiments, the maximum EV threshold and minimum SOC threshold may vary between waypoints based on the waypoint score (e.g., number of ignition-off events). For instance, the EV threshold may be higher when the vehicle 10 reaches the inner ring 78a of waypoint 74a, as opposed to the inner ring 78b of waypoint 74b, since waypoint 74a may have a higher waypoint score than waypoint 74b. Moreover, the radius of the outer ring 76 may increase as the waypoint score increases. Thus, the higher the confidence level for a particular waypoint 74 (e.g., the greater the number of ignition-off events), the greater distance the vehicle 10 may be from the waypoint 74 to begin adjusting the EV threshold and/or SOC threshold. For example, the radius of the outer ring 76a of waypoint 74a may be larger than the radius of the outer ring 76b of waypoint 74b because waypoint 74a may have a higher waypoint score than waypoint 74b.

Waypoint 74d may correspond to a learned location associated with a single, recent ignition-off event. Waypoint 74d may be stored in the database, despite only a single ignition-off event, because the ignition-off event may have recently occurred. However, according to one or more embodiments, the controller 54 may not adjust the EV threshold or the SOC threshold until additional ignition-off events are associated with waypoint 74d. Thus, waypoint 74d may not be associated with an imaginary outer ring 76 or inner ring 78, as depicted in FIG. 2.

Figure 3:
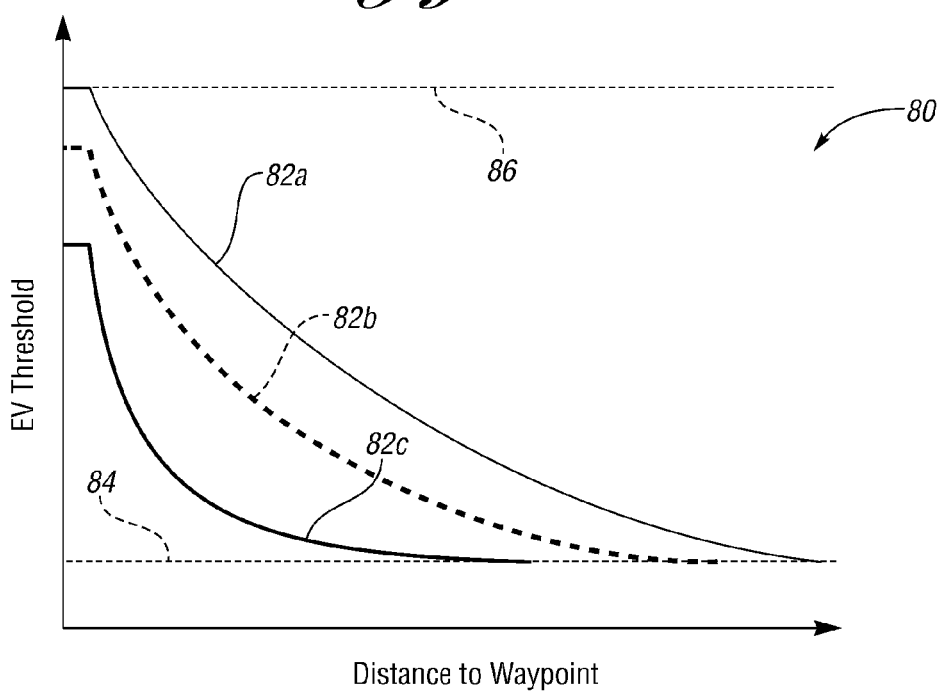
FIG. 3 is a simplified, exemplary graph of an EV threshold as a function of distance to a waypoint according to one or more embodiments of the present application.

FIG. 3 illustrates a simplified, exemplary graphical plot 80 depicting the EV threshold as a function of distance to a waypoint for three exemplary waypoints, each having a different waypoint score. For example, line 82a may correspond to the waypoint score for waypoint 74a, line 82b may correspond to the waypoint score for waypoint 74b, and line 82c may correspond to the waypoint score for waypoint 74c. As in FIG. 2, the score for waypoint 74a may be greater than the score for waypoint 74b, which may be greater than the score for waypoint 74c.

The EV threshold may have a normal threshold value 84. The normal threshold value 84 may correspond to the EV threshold under normal operating conditions. Although the normal threshold value 84 is shown as fixed in FIG. 3, it may change as vehicle operating conditions change. The EV threshold may also have a maximum threshold value 86. The maximum threshold value 86 may correspond to the absolute maximum EV threshold that may be employed when the vehicle 10 approaches a known waypoint 74 (e.g., when the waypoint score indicates maximum confidence when predicting future ignition-off events). Thus, the controller 54 may only increase the EV threshold to the maximum threshold value 86 when the vehicle 10 reaches the inner ring 78 of a waypoint 74 having a relatively high waypoint score.

As shown in FIG. 3, for a given waypoint 74, the EV threshold may increase as the distance to the waypoint decreases. For instance, with reference to line 82a, the EV threshold may begin increasing when the vehicle 10 is a relatively farther distance to the waypoint 74a as compared to the other waypoints. Moreover, as the vehicle 10 nears the waypoint 74a, the EV threshold may continue to be increased until it reaches the maximum EV threshold value 86, e.g., when the vehicle reaches the inner ring 78a. As another example, line 82b demonstrates an exemplary EV threshold as a function of distance to waypoint 74b, which may be associated with an intermediate waypoint score. As seen therein, the EV threshold may not be increased until the vehicle is relatively closer to the waypoint 74b when compared to waypoint 74a. Moreover, the EV threshold may be clipped at a value less than the maximum EV threshold value 86 when the vehicle 10 reaches the inner ring 78b of waypoint 74b. Line 82c, corresponding to the lowest waypoint score between the three exemplary waypoints 74a-c, demonstrates that the EV threshold may not be increased until the vehicle 10 is relatively much closer to waypoint 74c and the EV threshold may be clipped at a value even less than that of waypoint 74b.

While lines 82a-c are shown as curves, they may be linear according to one or more embodiments of the present application. Additionally or alternatively, the x- and y-axes may not be linear and may not be to scale. Moreover, although the lines 82a-c depict a continuous increase in the EV threshold as the vehicle 10 nears a waypoint 74, the increases may occur at discrete distances. Accordingly, FIG. 3 merely illustrates a general, exemplary relationship between an EV threshold and a distance to a waypoint for waypoints having three different waypoint scores. A similar plot (not shown) may be used to characterize the SOC threshold as a function of vehicle distance to waypoint, except that the SOC threshold may decrease as the vehicle 10 nears a waypoint 74. Further, the controller 54 may employ one or more look-up tables (not shown) to determine the EV threshold and/or SOC threshold based upon the vehicle's distance to a waypoint and the corresponding waypoint score.

Figure 4:
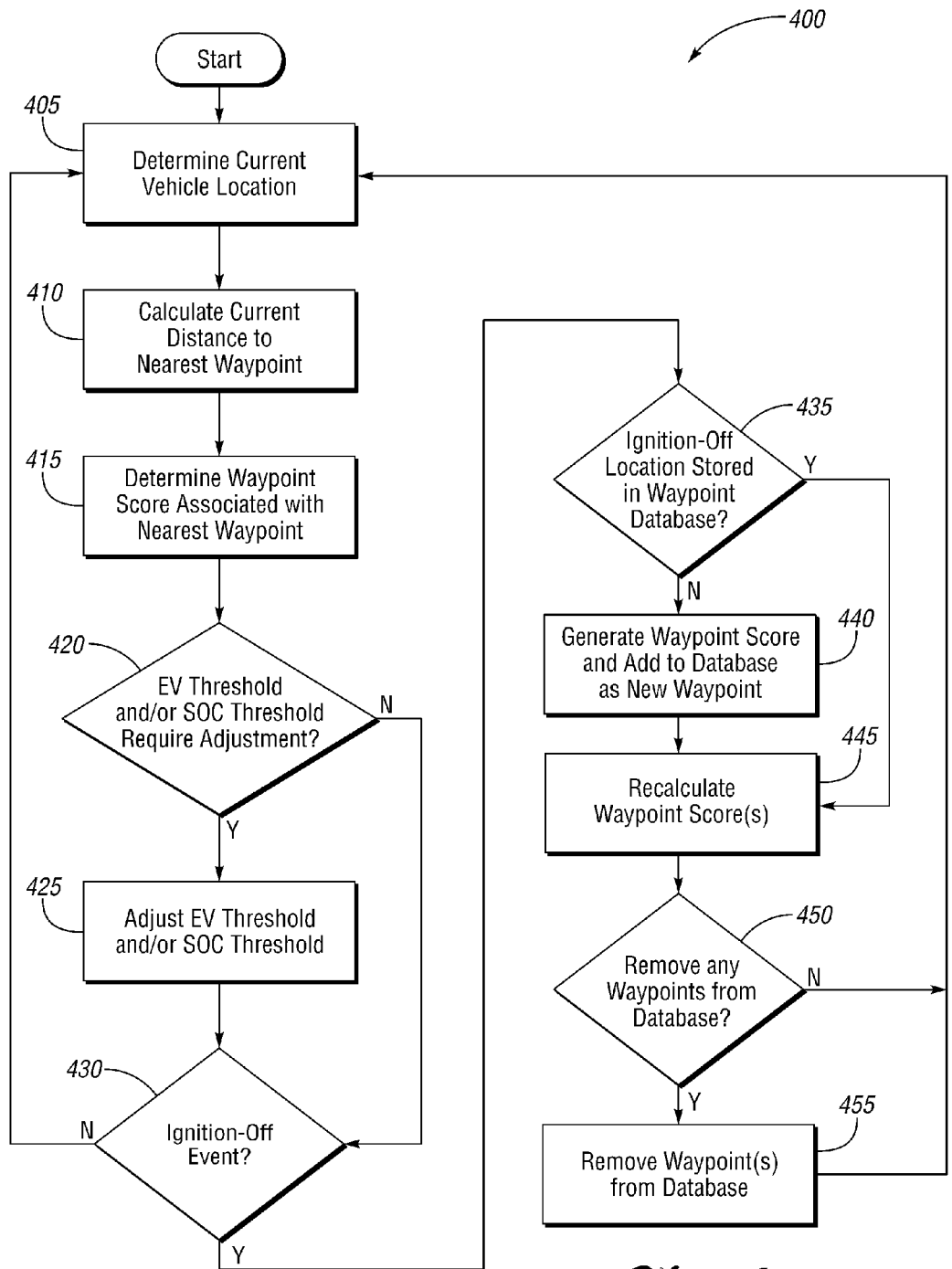
FIG. 4 is a simplified, exemplary flowchart depicting a method according to one or more embodiments of the present application.

Referring now to FIG. 4, a simplified, exemplary flowchart 400 depicting a method for adjusting the EV threshold and/or SOC threshold according to one or more embodiments of the present application is illustrated. At step 405, the vehicle's current location may be determined. For instance, the positioning system 62 may obtain latitude and longitude information for the vehicle 10 using a position sensor, and may transmit the coordinates to the controller 54. At step 410, the distance between the vehicle 10 and the nearest "learned" waypoint 74 may be calculated. In this regard, the controller 54 may compare the coordinates corresponding to the vehicle's current location with the coordinates of the waypoints 74 stored in the waypoint database 64. Once the nearest waypoint 74 is determined, the distance to the nearest waypoint may be ascertained. Further, at step 415, the waypoint score associated with the nearest waypoint 74 may be retrieved from the waypoint database 64. As previously described, the waypoint score may be a calculated or assigned value associated with each waypoint 74 indicative of a confidence level used to predict the likelihood of a future ignition-off event occurring at that waypoint. For example, the waypoint score may be based upon the number of past ignition-off events occurring at the waypoint and, perhaps, how recently one or more of those ignition-off events occurred.

At step 420, the controller may determine whether to adjust the EV threshold and/or SOC threshold based upon the distance to the nearest waypoint 74 and its corresponding waypoint score. For instance, the controller 54 may call upon a look-up table to obtain a value for the EV threshold and/or SOC threshold corresponding to the calculated distance and retrieved waypoint score. Moreover, the controller 54 may compare the look-up table values to the current EV threshold and SOC threshold values. If the look-up table values differ from the current EV threshold or SOC threshold, then the controller 54 may determine that the EV threshold and/or SOC threshold require adjustment. At step 425, the controller may adjust the EV threshold and/or SOC threshold consistent with the look-up table values. Further, the controller 54 may communicate a new EV threshold to the ECU and/or TCM. The controller 54 may communicate a new SOC threshold to the BCM 50. The method may then proceed to step 430.

If, at step 420, it is determined that the EV threshold and/or SOC threshold do not require adjustment based upon the distance to the nearest waypoint and the corresponding waypoint score, then the method may proceed directly to step 430. At step 430, the controller 54 may determine whether an ignition-off event has occurred. If no ignition-off event has occurred, then the method may return to step 405 where the vehicle's current location may be updated and the waypoint analysis may be repeated. If, on the other hand, an ignition-off event is detected, the method may proceed to step 435. At step 435, the controller 54 may determine whether the location of the ignition-off event generally corresponds to the coordinates of a waypoint 74 stored in the waypoint database 64. If the ignition-off location is not already stored as a waypoint 74 in the database 64, then the method may proceed to step 440. At step 440, the location information for the ignition-off occurrence may be stored in the database 64 as a new "learned" waypoint 74. Further, a waypoint score may be generated for the new waypoint and stored in the database 64 with the location information. The method may then proceed to step 445.

If, on the other hand, at step 435 the ignition-off location is already stored as a waypoint in the database 64, the method may proceed directly to step 445. At step 445, the waypoint scores associated with each of the waypoints 74 may be recalculated based on the latest ignition-off event. For instance, as previously described, an ignition-off event may affect the waypoint score of all stored waypoints 74, not just the waypoint at which the ignition-off event occurred. Once the waypoint scores have been recalculated, if necessary, the method may proceed to step 450. At step 450, the controller 54 may determine whether one or more waypoints 74 should be removed from the database 64 (i.e., "unlearned") based upon the recalculated waypoint scores. For example, if the ignition-off location is new, it may be added to the database 64 as a new waypoint 74. Consequently, a previously stored waypoint 74 may be removed from the database 64 if the total number of waypoints stored is limited. To this end, the waypoint 74 with the lowest score (e.g., fewest and/or least recent ignition-off events) may be deleted from the waypoint database 64.

If it is determined that one or more waypoints 74 should be unlearned, the method may proceed to step 455, and the one or more waypoints may be removed from the database 64. The method may then return to step 405 where the vehicle's current location may be updated and the waypoint analysis may be repeated. If, at step 450, it is determined that no waypoints 74 need to be unlearned, then the method return immediately to step 405 where the vehicle's current location may be updated and the waypoint analysis may be repeated.

It should be noted that the method of FIG. 4 as described herein is exemplary only, and that the functions or steps of the method could be undertaken other than in the order described and/or simultaneously as may be desired, permitted and/or possible.

While exemplary embodiments are described above, it is not intended that these embodiments describe all possible embodiments of the application. Rather, the words used in the specification are words of description rather than limitation, and it is understood that various changes may be made without departing from the spirit and scope of the application. Additionally, the features of various implementing embodiments may be combined to form further embodiments of the application.

What is claimed:

1. A method comprising: receiving coordinates from a positioning system corresponding to a current location of a vehicle; comparing the current location with coordinate information corresponding to a plurality of waypoints stored in a database to determine a nearest waypoint, each of the waypoints associated with a location of the vehicle where at least one prior ignition-off event occurred and a number of prior ignition-off events that occurred at the location; calculating a distance from the current location of the vehicle to the nearest waypoint; and based at least in part upon the distance and the number of prior ignition-off events associated with the nearest waypoint, increasing an electric vehicle (EV) threshold, corresponding to an amount of power requested by a driver through an accelerator pedal, require to start an engine when the vehicle is operating with the engine off and decreasing a state of charge (SOC) threshold associated with a battery, the SOC threshold corresponding to a minimum amount of charge the battery can contain without starting an engine in order to recharge the battery.

2. A method comprising: receiving a current location of a vehicle from a positioning system; calculating a distance from the current location to a nearest waypoint associated with a location of the vehicle where at least one prior ignition-off event occurred; and decreasing a minimum state-of-charge threshold associated with a battery based at least in part upon the distance and a number of prior ignition-off events associated with the nearest waypoint.

3. The method of claim 2, wherein receiving a current location of a vehicle includes: receiving coordinates information for the vehicle from the positioning system, wherein the positioning system is associated with the vehicle.

4. The method of claim 2, further comprising selecting the nearest waypoint from a plurality of waypoints stored in a database, each of the plurality of waypoints associated with a location of the vehicle where at least one prior ignition-off event occurred.

5. The method of claim 4, wherein the number of prior ignition-off events associated with the nearest waypoint is stored in the database along with coordinates for the nearest waypoint.

6. The method of claim 2, wherein decreasing the minimum state-of-charge threshold associated with a battery is further based upon the recentness of at least one of the number of prior ignition-off events associated with the nearest waypoint.

7. The method of claim 4, further comprising: detecting an occurrence of a new ignition-off event; and comparing a location associated with the new ignition-off event to a stored locations associated with the plurality of waypoints stored in the database.

8. The method of claim 7, further comprising: storing the location of the new ignition-off event as a new waypoint in the database upon a determination that the location does not correspond to a stored location associated with one of the plurality of waypoints stored in the database.

9. The method of claim 7, further comprising: upon a determination that the location of the new ignition-off event corresponds to a stored location associated with one of the plurality of waypoints stored in the database, increasing a count of ignition-off events associated with said one of the plurality of waypoints stored in the database.

10. The method of claim 2, further comprising: increasing an amount of power, requested by a driver through an accelerator pedal, required to start an engine when the vehicle is operating in an electric vehicle (EV) mode based at least in part upon the distance and the number of prior ignition-off events associated with the nearest waypoint.

11. The method of claim 10, wherein the step of increasing an amount of power required to start the engine includes increasing an electric vehicle (EV) threshold associated with the position of the accelerator pedal.

12. A vehicle system comprising: an engine; a positioning system that obtains location information associated a current location of a vehicle; a database including a plurality of waypoints, each waypoints associated with a location of the vehicle where at least one prior ignition-off event occurred and a number of prior ignition-off events that occurred at the location; and a controller, in communication with the positioning system, the database and the engine configured to: calculate a distance from the current location to a nearest waypoint stored in the database; and adjust an engine pull-up characteristic based at least in part upon the distance, and the recentness of at least one of the number of prior ignition-off events associated with the nearest waypoint.

13. The vehicle system of claim 12, further comprising: an accelerator pedal is communication with the controller, wherein adjusting an engine pull-up characteristic based at least in part upon the distance and the number of prior ignition-off events associated with the nearest waypoint includes increasing an electric vehicle (EV) threshold, corresponding to an amount of power requested by a driver through the accelerator pedal, required to start the engine when the vehicle is operating with the engine off.

14. The vehicle system of claim 12, further comprising: a battery in communication with the controller, wherein adjusting an engine pull-up characteristic based at least in part upon the distance and the number of prior ignition-off events associated with the nearest waypoint includes decreasing a minimum state of charge (SOC) threshold associated with the battery.

* * * * *